Feb. 2, 1932.                J. H. HUNT                 1,843,423
                       SPARE WHEEL CARRIER LOCK
                       Filed March 1, 1927         2 Sheets-Sheet 1

INVENTOR.
J. HAROLD HUNT
BY
ATTORNEY.

Feb. 2, 1932.  J. H. HUNT  1,843,423
SPARE WHEEL CARRIER LOCK
Filed March 1, 1927  2 Sheets-Sheet 2

INVENTOR.
J. HAROLD HUNT
BY
John P. Sarbox
ATTORNEY.

Patented Feb. 2, 1932

1,843,423

UNITED STATES PATENT OFFICE

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

SPARE WHEEL CARRIER LOCK

Application filed March 1, 1927. Serial No. 171,747.

This invention relates to locks and more particularly to locks for spare wheels of motor vehicles.

It is an object of this invention to provide a lock of the character indicated that will effectually prevent unauthorized removal of the lock by twisting, turning and the like.

Another object is to provide a lock for spare wheels that will securely hold and lock the wheel tightly to its carrier and thus prevent all possibility of rattle.

Further objects and objects relating to details of construction and operation will definitely appear from the detailed description to follow.

Figure 1:
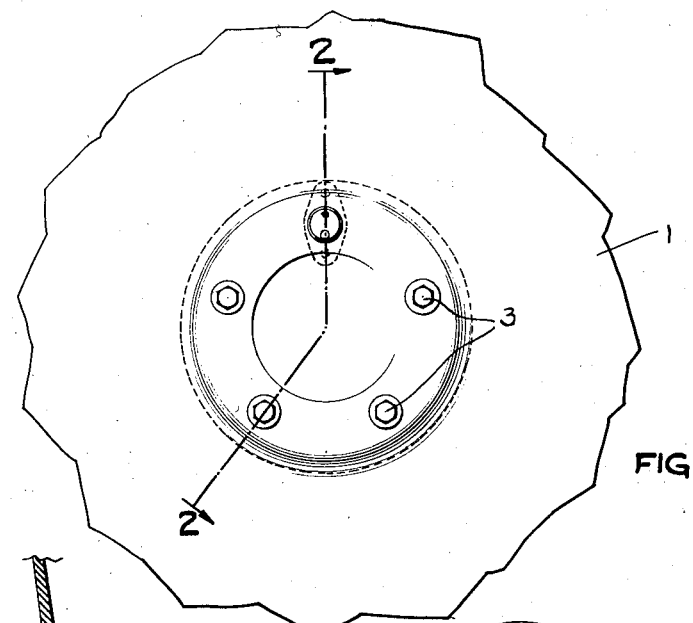
Figures 2, 5:
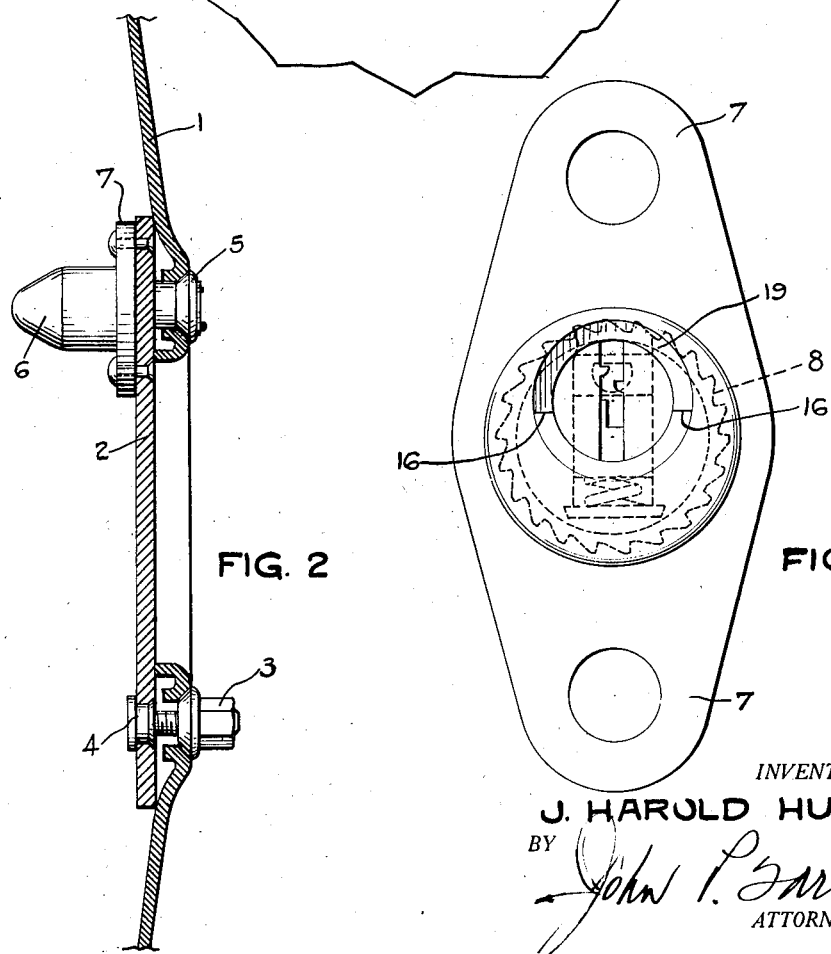
Figure 3:
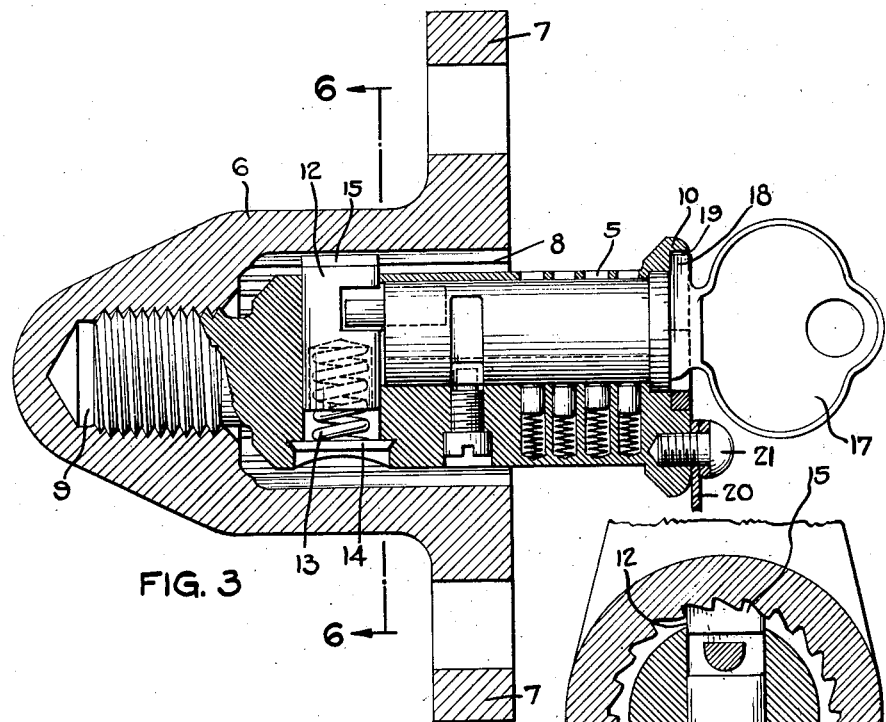
Figure 6:
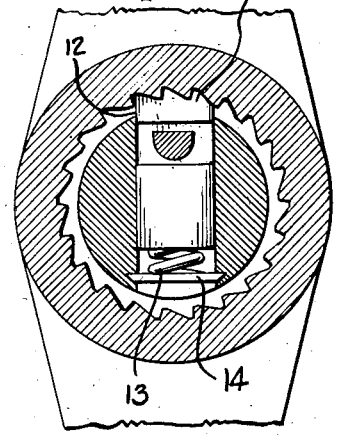
Figure 4:
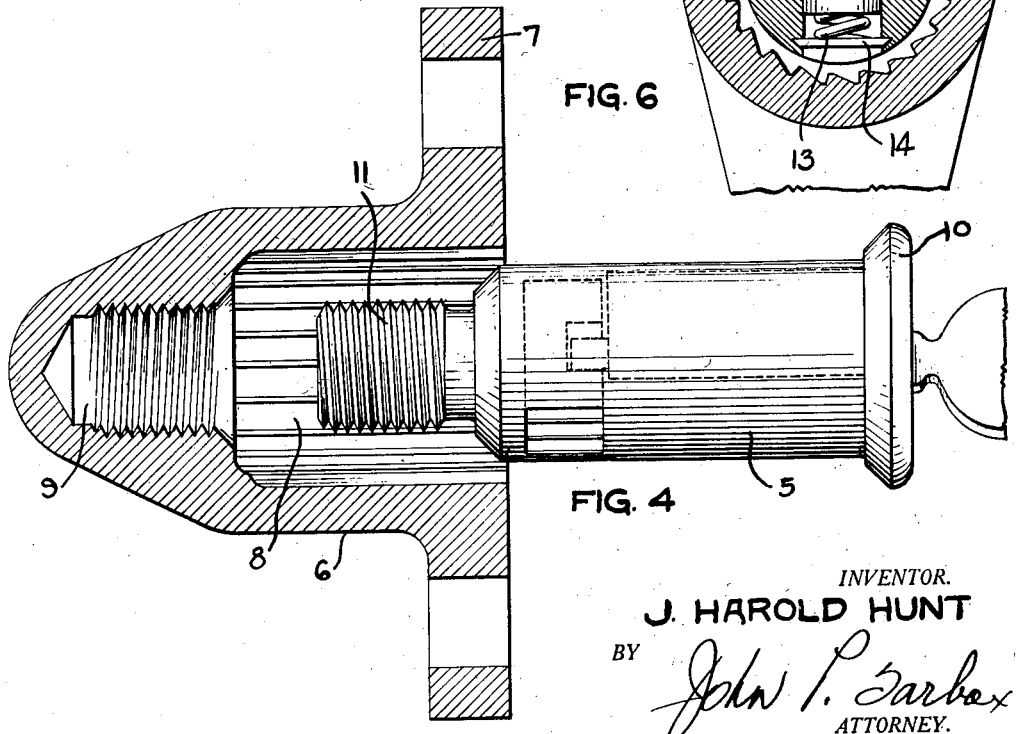

A structure constituting a preferred embodiment of my invention is illustrated in the accompanying drawings forming a part of this specification, in which:

Fig. 1 is a fragmentary elevational view of a spare wheel locked on a carrier by means of a lock of my invention, Fig. 2 is a fragmentary sectional view taken on line 2—2 of Fig. 1, Fig. 3 is a vertical sectional view showing the lock in locked position, Fig. 4 is a view similar to Fig. 3 but showing the locking stud disengaged from the socket member, Fig. 5 is a side elevation of the lock as shown in Fig. 3, and Fig. 6 is a sectional view taken on line 6—6 of Fig. 3.

My invention has been found to be particularly well adapted to locking wheels of the Michelin disk type to a spare wheel carrier. Wheels of this type have a series of bolt holes arranged concentrically with the center opening of the disk and positioned to receive the bolts mounted on the bolt circle of the hub flange. Each bolt hole of the wheel at its outside end portion is flared outwardly, thus presenting a coined or funnel shaped aperture in the enlarged portion of which the ball faced portion of the cap nut used with this type of wheel is seated. The spare wheel carrier for this type of wheel commonly consists of a circular plate having a series of bolts arranged and positioned identically with the bolts on the bolt circle of a hub flange, so that the spare wheel is mounted on its carrier much in the same manner that it is mounted on a hub. The carrier plate is, of course, attached to the vehicle body or chassis by any suitable means, such as by rods or the like.

I accomplish the objects of my invention, in general, by removing one of the bolts on the carrier plate and substituting therefor a socket member which is permanently mounted on the carrier plate with the opening in the socket member in register with the bolt hole. The locking member is in the form of a headed stud carrying a locking bolt and suitable mechanism for operating the same, and has a threaded extension thereon at the end opposite to the headed end. When the spare wheel is mounted on the carrier plate, the locking stud is passed through a bolt hole in the wheel and is screwed into the socket member, engaging the latter by means of the screw threaded extension. The head of the stud is of such configuration that when the stud is turned up tight against the wheel, the head sets snugly in the enlarged portion of the bolt hole and therefore presents no projecting parts capable of being gripped or grasped to aid in the unauthorized removal or breakage of the lock. As a corollary of this feature, the stud is capable of being locked in any position it may occupy when drawn up tight against the wheel.

Referring to the drawings, reference character 1 indicates a spare wheel mounted on a carrier plate 2 in the customary and usual manner with wheels of the Michelin type. The wheel is held on the carrier by means of the cap nuts 3 which engage cooperating bolts 4. The wheel is locked on its carrier by means of a lock of my invention consisting of a headed locking stud 5 and a socket member 6. The socket member 6, as clearly shown in Figs. 3 and 4, is substantially cup-shaped in form and is provided at its open end with projecting ears or lugs 7 by means of which it may be permanently attached to carrier plate 2 in any suitable manner. Interiorly thereof and for a greater part of its depth, the socket member is provided with longitudinally extending gear teeth 8, preferably ratchet teeth as shown, extending entirely around the interior of the socket member. Extending beyond the limits of the aperture, the walls of which are defined by the ratchet teeth just described, and communicating therewith, is a second aperture 9, preferably of smaller diameter, compared with the first aperture, the walls of which are screw threaded as shown.

The headed stud or locking member 5 is of elongated cylindrical form and is provided at one end with a head 10 and at the other end with a screw threaded extension 11 preferably of reduced diameter adapted to be received in the screw threaded portion 9 of socket member 6. Slidably mounted within the locking stud 5 is a bolt 12, normally pressed to projected or locking position by means of spring 13 adapted to be retained in position by metal disk 14. Bolt 12 is provided on its projecting end with ratchet teeth 15 suitably formed to cooperate with ratchet teeth 8 in socket member 6. Any suitable form of bolt operating mechanism may be employed for operating bolt 12, such as the cylinder lock mechanism shown in the drawings.

The head 10 of locking stud 5 is an exact duplicate of a cap nut 3 used to retain a wheel on its hub, except that the hexagonal wrench engaging extension of the cap nut is omitted, so that when the locking stud is turned up tight against the wheel into locked position the head of the stud completely fills the enlarged portion of the bolt hole, seating snugly therein, as clearly shown in Fig. 2, so that no part of the stud is capable of being gripped or taken hold of in any manner whereby unauthorized attempts at removal or breakage of the lock are effectually prevented. Since there are no projecting parts on the locking stud head, it follows that when the stud is nearing locking position some means must be provided to enable the stud to be turned up tightly against the wheel. This situation is adequately provided for in the lock of my invention. Head 10 has formed therein a slot 19, preferably arcuate, the opposite ends of which are defined by shoulders 16 with the keyhole lying radially of said arc and intermediate the shoulders 16 as will be seen from an inspection of Fig. 5. Key 17 is provided with a projecting lug or extension 18 adapted to move in slot 19 and to engage shoulders 16. When the key extension 18 is in alignment with the keyhole slot, the locking bolt 12 is in projected or locking position but when extension 18 is in contact with either of the shoulders 16, the bolt is in retracted or unlocking position, and stud 5 may be turned freely in either direction to lock or unlock the wheel to or from its carrier. Thus when the stud is nearing locking position and it is no longer possible to turn it by hand, the key with extension 18 abutting a shoulder 16 provides adequate means for finally positioning the stud tightly against the wheel. In order to prevent the entrance of dirt, dust, etc., into the slot 19 and keyhole, a dust guard 20 is pivoted to the head 10 by suitable means such as the pin 21, and may be swung to cover the keyhole and slot 19 when it is not desired to use the key.

The locking of a spare wheel on its carrier is accomplished substantially as follows: The spare wheel to be locked is mounted on the carrier plate 2 and the cap nuts 3 are turned up on bolts 4 until they are tight against the wheel. Locking stud 5 is inserted through the bolt hole in the wheel and advanced until the threaded extension 11 of the locking stud engages the screw threads in the socket member. The stud is then screwed up against the wheel by hand as far as it can be turned in this manner. Key 17 is then inserted into the key hole slot at which time the extension 18 will lie in slot 19 and the key is turned in the proper direction until extension 18 engages a shoulder 16, when further turning of the key will turn the locking stud. In this manner the stud may be advanced to locking position, when the head 10 thereof will bear tightly against the wheel as clearly shown in Fig. 2. To remove the lock, these operations are carried out in their reverse order. It is apparent that with the ratchet teeth 8 positioned entirely around the interior wall of the socket member, that the locking stud may be locked in any position it may occupy when drawn up tightly against the wheel. Thus, regardless of variations in thickness of the carrier plate 2 and regardless of any irregularities that might exist in the central portions of the wheel, the latter can always be locked tightly against the carrier plate and thereby prevent any possibility of rattle.

It will thus be apparent that the objects of my invention are accomplished and an efficient and secure spare wheel lock is provided. Due to the fact that the head of the locking stud when in locked position is snugly seated in the enlargement of the bolt hole through which the locking stud is passed, whereby projecting parts of the locking means are entirely eliminated, the lock completely and effectually resists unauthorized removal or breakage. And further, because of the cooperating locking structure of the socket member and locking stud, the wheel may be drawn tightly against its carrier and locked in that position regardless of dimensional variations in the carrier or wheel body, whereby any possibility of rattle is removed.

Although I have illustrated and described my locking device as particularly well adapted to the locking of spare wheels to carriers and especially to the locking of the Michelin type of disk wheel to a suitable carrier, it is apparent and I wish it to be understood, that my locking device is capable of other and various adaptations. I therefore do not limit myself to the precise embodiment of my invention selected for illustration, but claim my invention broadly as indicated by the appended claim.

Having thus described my invention, what I claim as new and desire to secure by Letters Patent is:—

In combination, a threaded stud member, a socket member, a threaded portion in said socket member, a portion of larger diameter than said threaded portion, having longitudinal grooves extending through substantially its entire length, and means within said stud to complementally engage with said grooves and lock said stud to said socket member at any desired depth of threaded engagement.

In testimony whereof he hereunto affixes his signature.

J. HAROLD HUNT.